(12) United States Patent
Ohira

(10) Patent No.: US 7,792,374 B2
(45) Date of Patent: Sep. 7, 2010

(54) IMAGE PROCESSING APPARATUS AND METHOD WITH PSEUDO-CODED REFERENCE DATA

(75) Inventor: Tadashi Ohira, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1302 days.

(21) Appl. No.: 10/823,330

(22) Filed: Apr. 12, 2004

(65) Prior Publication Data

US 2004/0213473 A1 Oct. 28, 2004

(30) Foreign Application Priority Data

Apr. 28, 2003 (JP) ............................ 2003/123585
Mar. 31, 2004 (JP) ............................ 2004/102542

(51) Int. Cl.
*G06K 9/36* (2006.01)

(52) U.S. Cl. ..................... 382/239; 341/51; 358/426.02; 358/426.03; 358/426.04; 358/426.05; 358/426.11

(58) Field of Classification Search ................. 382/239; 341/51; 358/426.02–426.11
See application file for complete search history.

(56) References Cited

U.S. PATENT DOCUMENTS

2001/0040700 A1* 11/2001 Hannuksela et al. ..... 358/261.2
2003/0086622 A1* 5/2003 Klein Gunnewiek et al. ..... 382/240
2003/0156198 A1* 8/2003 Lee ........................ 348/207.99

OTHER PUBLICATIONS

H.261: Video codec for audiovisual services at p x 64 kbit/s approved in 1993 (available from Int'l Telecommunication Union).
H.263: Video coding for low bit rate communication (available from International Telecommunication Union (ITU) (www.itu.org) <http://www.itu.org/>).
MPEG •5 1• : ISO/IEC 11172-1:1993 (available from International Organization for Standardization (ISO) (www.iso.org <http://www.iso.org/>).
MPEG •5 2•: ISO/IEC 13818-1:2000 (available from International Organization for Standardization (ISO) (www.iso.org <http://www.iso.org/>).

* cited by examiner

*Primary Examiner*—Vikkram Bali
*Assistant Examiner*—Eueng-Nan Yeh
(74) *Attorney, Agent, or Firm*—Canon U.S.A., Inc. I.P. Division

(57) ABSTRACT

An image processing apparatus and method decodes interceded image data, even if reference image data is lost. The apparatus and method perform first coding that codes input image data by transforming the input image data into frequency components in units of blocks and coding the frequency components by adaptively using an intracoding mode and an interceding mode, second coding that codes frequency components obtained by limiting the frequency components for reference image data for use in the interceding mode, and outputting combined data obtained by combining the image data coded in the second coding with the image data coded by the first coding.

6 Claims, 15 Drawing Sheets

| ERROR DETECTION | DETECTED | DETECTED | NOT DETECTED | NOT DETECTED |
|---|---|---|---|---|
| PICTURE TYPE | I FRAME | OTHER THAN I FRAME | I FRAME | OTHER THAN I FRAME |
| CONTROL SIGNAL | – | OFF | ON | ON |

IMAGE PROCESSING APPARATUS AND METHOD WITH PSEUDO-CODED REFERENCE DATA

BACKGROUND OF THE INVENTION

1. Field of the Invention

The present invention relates to an image processing apparatus and method, and specifically, to interframe coding on video image data and decoding on coded video image data.

2. Description of the Related Art

Intraframe coding methods, such as Motion JPEG (Joint Photographic Experts Group) and DV (Digital Video), and interframe predictive coding methods, such as H.261, H.263, MPEG-1, and MPEG-2, are known image coding methods of the related art.

These coding methods have been internationally standardized by the International Organization for Standardization (ISO) and the International Telecommunication Union (ITU).

Intraframe coding methods are adequate for apparatuses requiring video image editing and special playback since the methods perform separate coding in units of frames and therefore, frames can be easily managed. Also, interframe coding methods have a feature of high coding efficiency since the methods use interframe prediction.

In addition, the coding standards include a new coding standard called "MPEG-4" which is a next-generation general-purpose multimedia coding standard that can be used in many fields of computers, broadcasting, and communication, etc.

In the H.261, H.263, MPEG-1, and MPEG-2 standards, the frame-unit coding in use is divided into three types, that is, an intra-picture (I picture) that is only intraframe-coded, a predictive-coded picture (P picture) that also performs interframe prediction from the closest past frame, and a bidirectionally-coded picture (B picture) that additionally performs interframe prediction from the closest future frame.

In the interframe coding, all frames must be sequentially transmitted for referring to the closest past frame. When one party performs data transmission after establishing a communication link with another party in the case of, for example, a telephone line or an ISDN (Integrated Services Digital Network) line, no problem occurs since data sequentially reaches the other party without becoming lost on the path between both parties. However, since, in the case of, for example, a local area network (LAN) and an asynchronous transfer mode (ATM), no communication link is established, and coded data is transmitted in a form divided into smaller data units (packets or cells), some packets may be lost in the communication channel, and the order of packets may be switched due to the use of different communication channels.

In order that the packet receiving party may know the original order of packets, even if the order of packets is switched, the reliability of the network is enhanced such that the packet transmitting party transmits serially numbered packets, or a protocol (e.g., TCP (Transmission Control Protocol)) which confirms the arrival of packets or which sends back an undelivered-packet re-send request from the receiving party to the transmitting party.

When the operation of the network is unstable causing packets to be frequently lost, the user of the above protocol to perform re-sending accumulates transmission delays. Thus, the above protocol is not suitable for real-time transmission of video images.

In addition, in broadcast and multicast which have become popular as use of the Internet has become widespread, and which is used for multipoint data transmission, a mechanism for transmitting data to a plurality of points by performing packet transmission one time is used. In this mechanism, when a packet is lost during packet transmission to one point, re-sending such as using the above protocol greatly increases the network load because, despite normal arrival of the first packet, the other points must re-send identical packets through the network. Accordingly, in broadcast and multicast, it is common to use a protocol (e.g., UDP (User Data Protocol)) that does not perform re-sending. Nevertheless, the use of this protocol increases a probability that lost packets occur.

When a wireless network is used, not only the case of transmitting packets obtained by dividing data, but also even the case of transmitting data after establishing a link tends to increase the data error rate or the lost packet/data rate. In particular, if the receiving party detects an error, when a received signal includes errors beyond its error correcting ability, a method that abandons data in a certain section in order to perform normal processing on the other parts of data is employed. Accordingly, the amount of lost data is larger than that in the case of a wired network.

By using video image data as an example of lost data in packet transmission, a specific example in an MPEG-4 case is described below.

FIG. 1 is an illustration of an example of lost frames in packet transmission of video image data.

FIG. 1 shows MPEG-4 video-image-data frames a to e. Frame a is an I frame that is intraframe-coded. Frame b to frame e are P frames that are interframe-predictive-coded.

As shown in FIG. 1, when frame c is lost during transmission, and when frame c cannot be decoded due to a delay in decoding on frame c, frame c cannot be decoded until the next I frame i (not shown) arrives, so that it is impossible to decode frames d, e, . . . , which are P frames existing until the next I frame i arrives.

Accordingly, in order to ensure transmission of all the frames on a network on which such lost frames and time release frequently occur, a method that transmits all the frames not by using interframe coding but by using only intraframe coding, such as JPEG, has been employed. For example, in the case of JPEG coding, even if frame c is lost, decoding of the next frame can be performed. In this case, redundancy of temporal changes is not eliminated since no interframe coding is performed, thus causing a problem in that the amount of transmitted data is increased by a bad coding efficiency.

In addition, there is a known technology in which, when video image data is transmitted by using interframe coding (interceding) and intraframe coding (intracoding), a transmitting party estimates a portion of an image which may be affected by error, performs forcible intraframe coding on the estimated portion, and transmits the coded portion to a receiving party. In this case, it is difficult to estimate the portion of the image which may be affected by the error. The estimation may be wrong, so that deterioration in image quality cannot completely be eliminated.

From the above description, image coding and decoding are in demand in which, by using interframe coding to suppress a decrease in coding efficiency obtained when a small number of errors occur, even if an error occurs, a P frame can be decoded without awaiting an I frame which is later sent and image quality has less deterioration.

SUMMARY OF THE INVENTION

In view of the above-described circumstance, the present invention provides an image processing apparatus and method in which, when frames of intercoded video-image data are decoded, even if a reference frame for a frame to be decoded is lost, the frame to be decoded is decoded.

According to an aspect of the present invention, an image processing apparatus is provided which includes an input unit for inputting image data, a first coding unit for coding the input image data by transforming the input image data into frequency components in units of blocks and coding the frequency components by adaptively using an intracoding mode and an interceding mode, a second coding unit for coding frequency components obtained by limiting the frequency components for reference image data for use in the intercoding mode, and a multiplexing unit for outputting combined data obtained by combining the image data coded by the second coding unit with the image data coded by the first coding unit.

According to another aspect of the present invention, an image processing apparatus which includes an input unit for inputting image data, a first coding unit for coding the input image data by transforming the input image data into frequency components in units of blocks and coding the frequency components by adaptively using an intracoding mode and an interceding mode, a second coding unit for coding frequency components obtained by limiting the frequency components for image data obtained by performing local decoding on the image data coded by the first coding unit, and a multiplexing unit for outputting combined data obtained by combining the image data coded by the second coding unit with the image data coded by the first coding unit.

According to another aspect of the present invention, an image processing apparatus is provided which includes an input unit for inputting coded image data obtained by performing transformation into frequency components in units of blocks and coding the frequency components by adaptively using an intracoding mode and an intercoding mode, and pseudo-coded reference data obtained by coding frequency components obtained by limiting the frequency components for reference image data for use in the intercoding mode, a first decoding unit for decoding the coded image data input by the input unit, and a second decoding unit for decoding the pseudo-coded reference data input by the input unit. When a reference image is lost in decoding on the image data coded in the intercoding mode, the first decoding unit uses, as the reference image, image data obtained such that the second decoding unit decodes the pseudo-coded reference data.

According to another aspect of the present invention, an image processing method is provided which includes an input step of inputting image data, a first coding step of coding the input image data by transforming the input image data into frequency components in units of blocks and coding the frequency components by adaptively using an intracoding mode and an interceding mode, a second coding step of coding frequency components obtained by limiting the frequency components for reference image data for use in the interceding mode, and a multiplexing step of outputting combined data obtained by combining the image data coded in the second coding step with the image data coded in the first coding step.

According to another aspect of the present invention, an image processing method is provided which includes an input step of inputting image data, a first coding step of coding the input image data by transforming the input image data into frequency components in units of blocks and coding the frequency components by adaptively using an intracoding mode and an interceding mode, a second coding step of coding frequency components obtained by limiting the frequency components for image data obtained by performing local decoding on the image data coded in the first coding step, and a multiplexing step of outputting combined data obtained by combining the image data coded in the second coding step with the image data coded in the first coding step.

According to another aspect of the present invention, an image processing method is provided which includes an input step of inputting coded image data obtained by performing transformation into frequency components in units of blocks and coding the frequency components by adaptively using an intracoding mode and an intercoding mode, and pseudo-coded reference data obtained by coding frequency components obtained by limiting the frequency components for reference image data for use in the intercoding mode, a first decoding step of decoding the coded image data input in the input step, and a second decoding step of decoding the pseudo-coded reference data input in the input step. When a reference image is lost in decoding on the image data coded in the interceding mode, in the first decoding step, image data obtained by decoding the pseudo-coded reference data in the second decoding step is used as the reference image.

Other objects, features and advantages of the invention will become apparent from the following detailed description taken in conjunction with the accompanying drawings.

DESCRIPTION OF THE PREFERRED EMBODIMENTS

Embodiments of the present invention are described below with reference to the accompanying drawings.

First Embodiment

In a first embodiment of the present invention, MPEG-4 coding is described as an example of interframe coding. However, the first embodiment of the present invention is not limited to MPEG-4 coding.

An image coding apparatus 2 (FIG. 3) according to the first embodiment of the present invention generates coded data for one frame (hereinafter referred to as "pseudo-coded reference data") which is obtained such that direct current (DC) components and some of alternating current (AC) components of discrete cosine transform (DCT) coefficients, obtained by dividing an I frame (frame which is intraframe-coded (intra-coded)) into blocks and performing DCT processing on the blocks, are coded as effective components (AC components other than the some of the AC components of the DCT coefficients are regarded as zeroes). The image coding apparatus 2 accumulates the pseudo-coded reference data in a memory. The image coding apparatus 2 stores the pseudo-coded reference data in a user data area for a P frame (frame which is interframe-coded (inter-coded)) in an MPEG-4 steam. Accordingly, when a reference frame for a P frame is lost due to some accident occurring in data transmission from the image coding apparatus 2 to an image decoding apparatus, by using, as a reference frame, a frame obtained from the pseudo-coded reference data combined with stream data of the P frame, the P frame is decoded.

Figure 1:
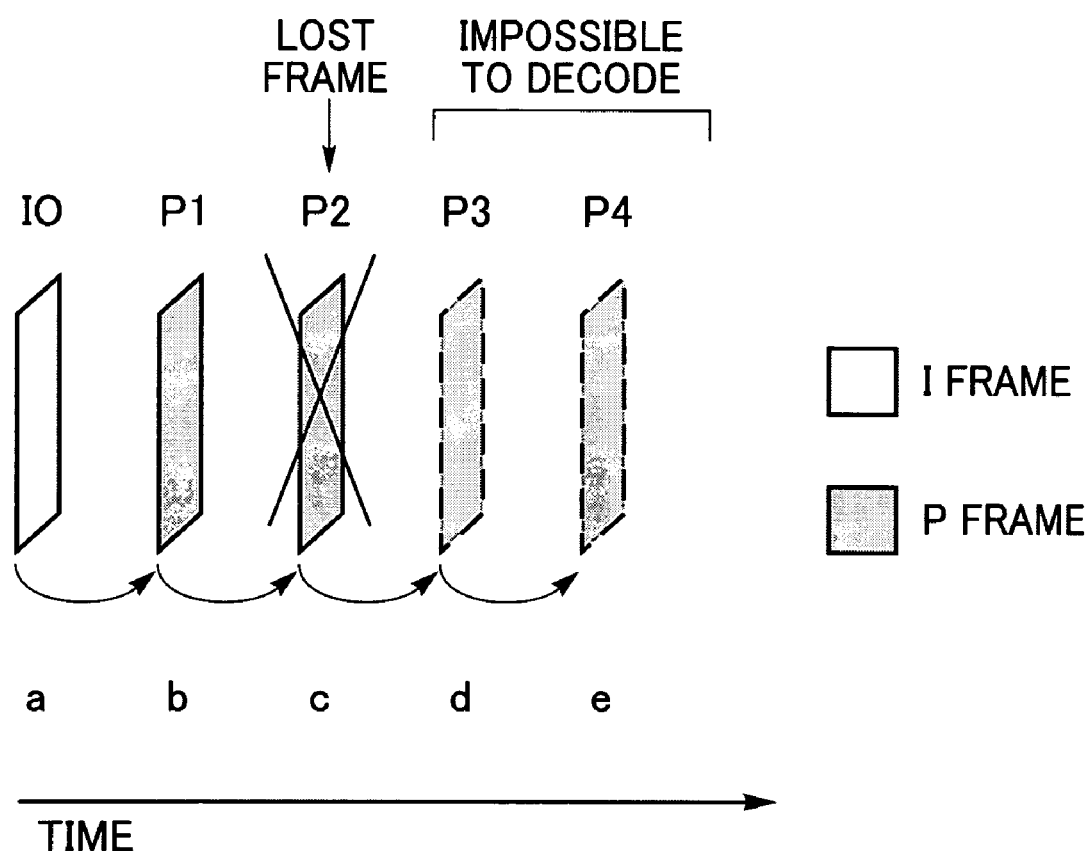
FIG. 1 is an illustration of lost frames in packet transmission of video image data.
Figure 2:
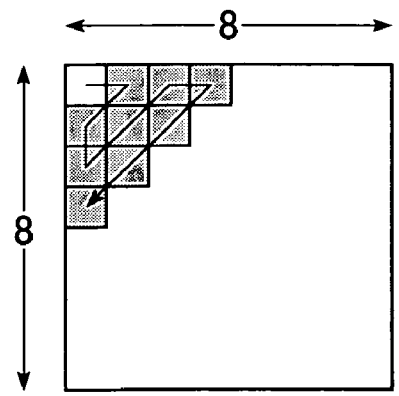
FIG. 2 is an illustration of reference components.

In the first embodiment of the present invention, processing units for coding are macroblocks (hereinafter also referred to as "MBs"). Also, in the first embodiment, some of the AC components means the first to ninth coefficients in the case of reading the inside of a DCT block composed of 8 by 8 pixels in zigzag scanning order, as shown in FIG. 2. In other words, the pseudo-coded reference data is coded data for one frame obtained such that DC components and some of the AC components as shown in FIG. 2 are coded with the other components regarded as zeroes. More specifically, after DC components and some of the AC components of coefficient data, read from the DCT block, is coded, an End of Block (EOB) code is added to the coded coefficient data before coding of the DCT block ends.

The effective components are not limited to the above DC components and AC components, but may be only the DC components. Alternatively, some of the mentioned above AC components may be those other than the nine coefficients. When only the DC components are used as the effective coefficients, the amount of pseudo-coded reference data can be reduced.

The first embodiment of the present invention is specifically described below with reference to the accompanying drawings.

Figure 3:
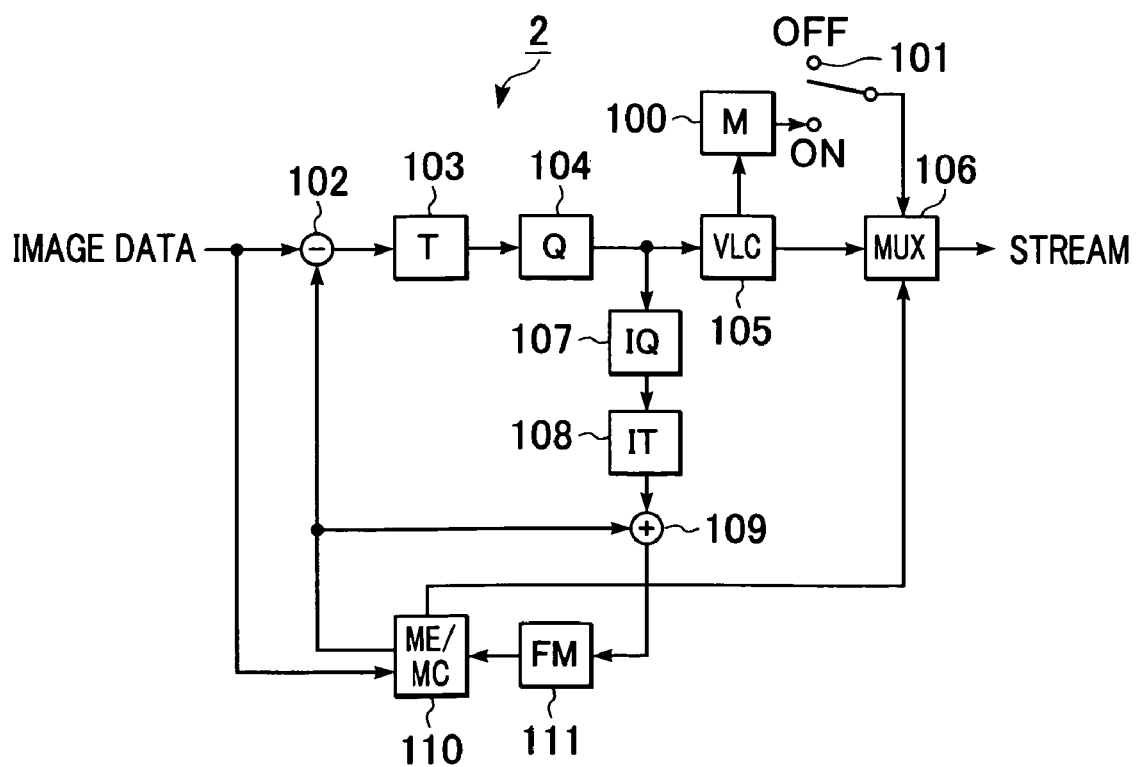
FIG. 3 is a block diagram showing an image coding apparatus according to a first embodiment of the present invention.

FIG. 3 is a block diagram showing the structure of the image coding apparatus 2 according to the first embodiment of the present invention.

Referring to FIG. 3, the image coding apparatus 2 transforms input pixel (image) data into an MPEG-4 stream, which is a transmittable data string, and outputs the MPEG-4 stream.

A memory 100 (indicated by M in FIG. 3) stores the pseudo-coded reference data of an I frame. A switch 101 selects whether the pseudo-coded reference data from the memory 100 is to be supplied to a multiplexer 106 (indicated by MUX in FIG. 3) (described later).

A subtractor 102 outputs input MB data in unchanged form when the input MB data is an I frame. When the input MB data is a P frame, the subtractor 102 subtracts predictive MB data from the input MB data, and outputs the resultant data.

A DCT unit 103 (indicated by T in FIG. 3) performs DCT processing on the data output by the subtractor 102. A quantization unit 104 (indicated by Q in FIG. 3) quantizes DCT coefficient data output from the DCT unit 103.

A variable length coding unit 105 (indicated by VLC in FIG. 3) performs variable length coding on representative quantized values output by the quantization unit 104 and outputs the coded values to multiplexer 106 (indicated by MUX in FIG. 3). The variable length coding unit 105 generates and outputs, to the memory 100, the pseudo-coded reference data (data obtained by performing coding with DC components and some of the AC components used as effective components, and the other components regarded as ineffective).

When the switch 101 is off (while intraframe coding is being performed), the multiplexer 106 directly outputs a stream input from the variable length coding unit 105. When the switch 101 is turned on, establishing connection between the multiplexer 106 and the memory 100 (while interframe coding is being performed), the multiplexer 106 outputs a stream obtained by combining the pseudo-coded reference data stored in the memory 100, the coded data output from the variable length coding unit 105, and motion-vector data output by a motion compensation unit 110 (described later). The multiplexer 106 also combines a type code representing picture types (e.g., an I frame, a P frame).

An inverse quantization unit 107 (indicated by IQ in FIG. 3) inversely quantizes the representative quantized values from the quantization unit 104. An inverse DCT unit 108 (indicated by IT in FIG. 3) performs inverse DCT processing on DCT coefficient data from the inverse quantization unit 107. An adder 109 adds the output of the inverse quantization unit 108 and an output from a motion compensation unit 110 (indicated by ME/MC in FIG. 3) (described later). The inverse quantization processing by the inverse quantization unit 107, and the inverse DCT processing by the inverse DCT unit 108 are called "local decoding".

The motion compensation unit 110 performs motion vector detection by comparing the input MB data and a frame (reference frame) stored in a frame memory 111 (indicated by FM in FIG. 3) (described later), motion compensation in response to the result of the detection, and outputs predictive MB data. The motion compensation unit 110 also outputs motion-vector data obtained in the motion vector detection to the multiplexer 106. The frame memory 111 stores image data of a reference frame used when the motion compensation unit 110 performs motion compensation processing.

In the above-described configuration, in the image coding apparatus 2 according to the first embodiment of the present invention, the pseudo-coded reference data is stored in the memory 100, and the switch 101 is turned on when P-frame processing is performed, whereby the multiplexer 106 outputs the combined stream obtained by combining the pseudo-coded reference data and the motion-vector data with the stream of P-frame coded data.

Next, the operation of the image coding apparatus 2 in FIG. 3 is fully described below.

At first, an I-frame coding of the image coding apparatus 2 in FIG. 3 is described with reference to the flowchart shown in FIG. 4.

Figure 4:
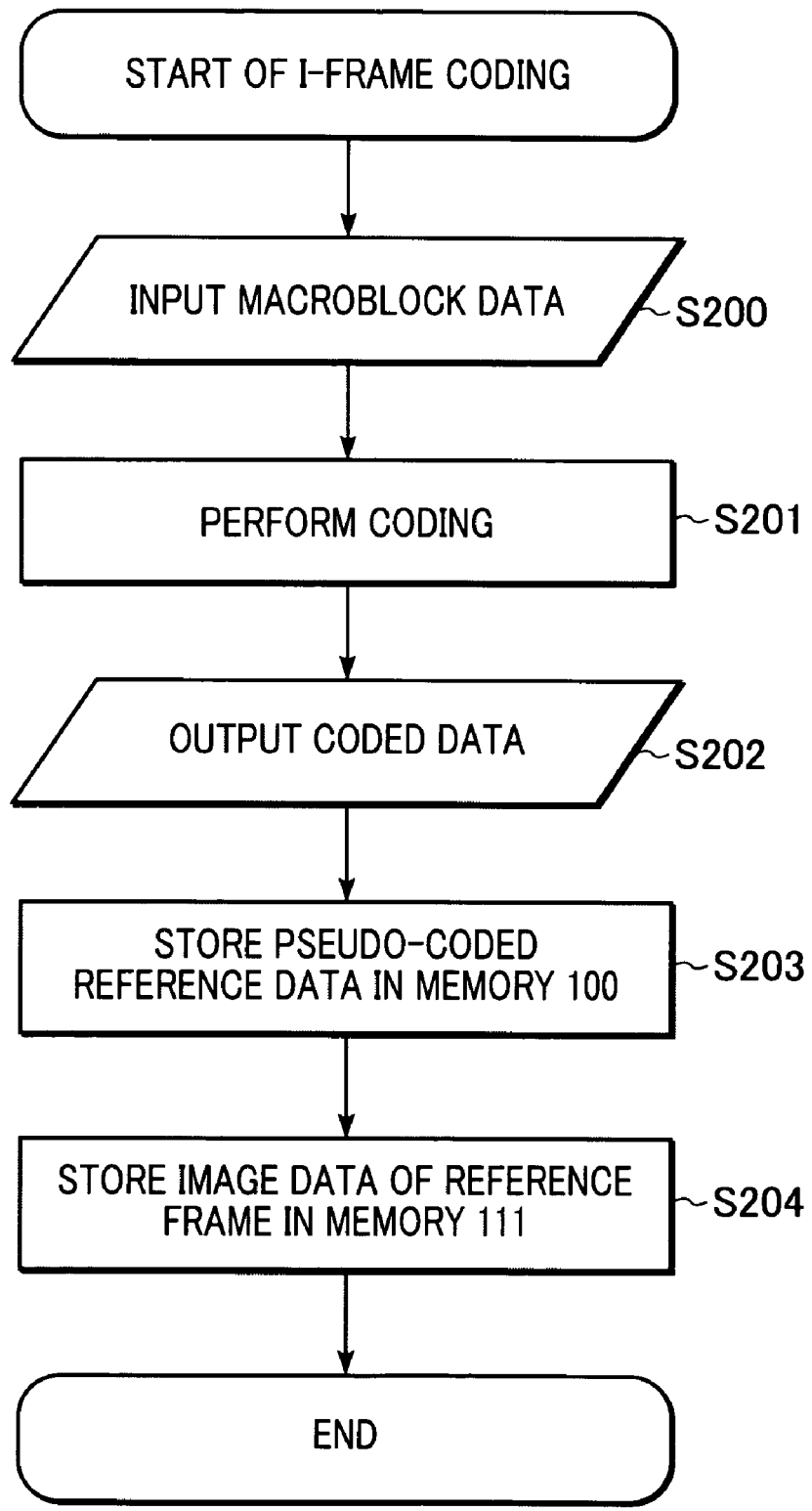
FIG. 4 is a flowchart showing a process in which the image coding apparatus 2 shown in FIG. 3 perform coding on an I frame that does not use a reference frame.

FIG. 4 is a flowchart showing a process in which the image coding apparatus 2 encodes an I frame which does not use a reference frame.

Referring to FIG. 4, in step S200, MB data constituting each frame of image data is input to the image coding apparatus 2. In step S201, after passing through the subtractor 102, the input MB data is processed such that DCT processing, quantization processing, and variable length coding are performed by the DCT unit 103, the quantization unit 104, and the variable length coding unit 105, respectively. In step S202, a data stream which is output by the variable length coding unit 105 and which is obtained by variable length coding of the variable length coding unit 105 is output from the multiplexer 106.

In step S203, the image coding apparatus 2 stores, in the memory 100, the pseudo-coded reference data generated by the variable length coding unit 105.

In step S204, image data, obtained such that the representative quantized values output by the quantization unit 104 are processed by the inverse quantization unit 107 and the inverse DCT unit 108, is stored as data of the next reference frame in the frame memory 111. After that, the I-frame coding process of the image coding apparatus 2 ends.

Next, the operation of the image coding apparatus 2 in the case of coding a P frame by using a reference frame is described with reference to the flowchart shown in FIG. 5.

Figure 5:
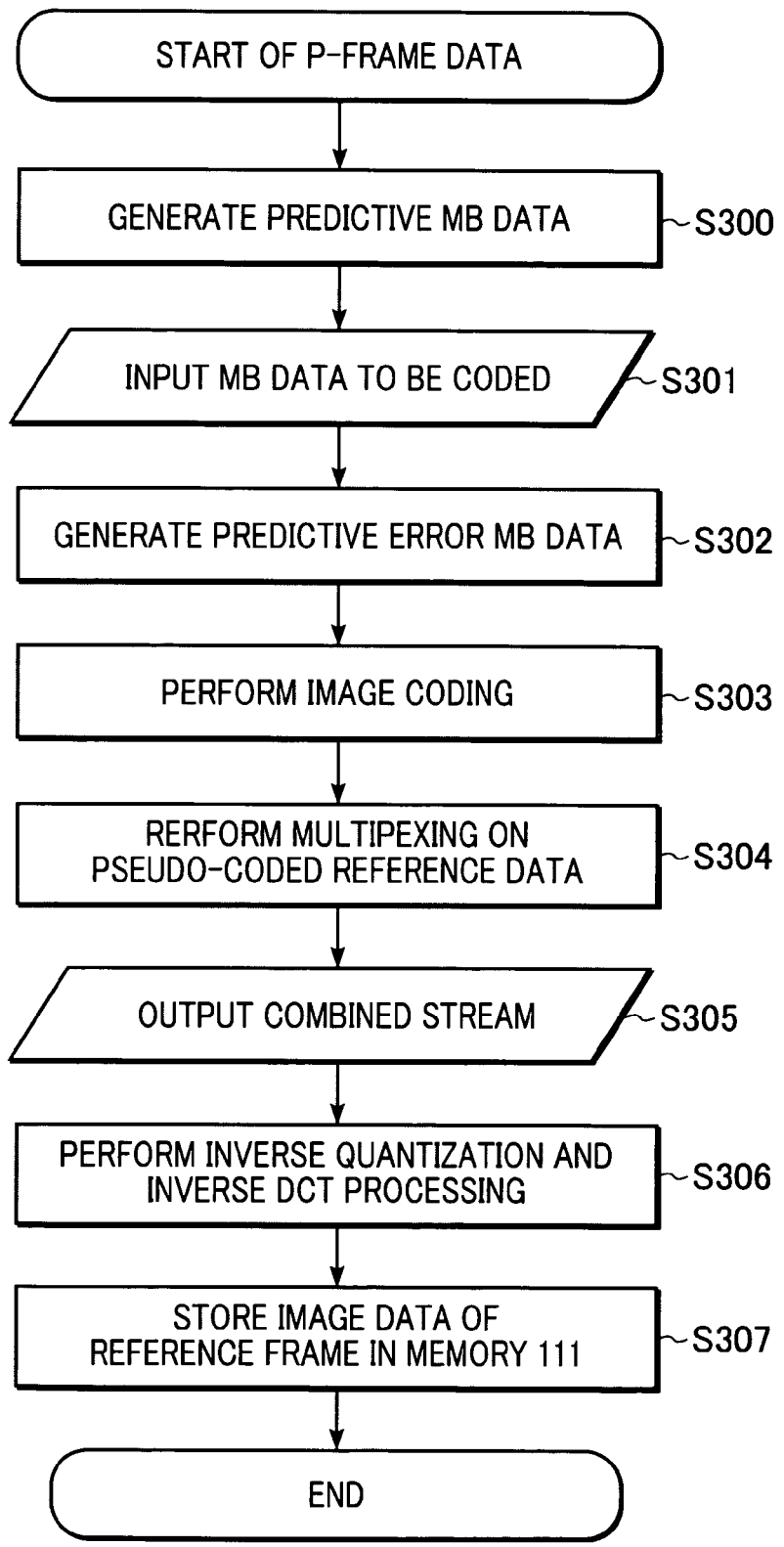
FIG. 5 is a flowchart showing a process in which the image coding apparatus 2 shown in FIG. 3 performs coding on a P frame.

FIG. 5 is a flowchart showing a process in which the image coding apparatus 2 performs P-frame coding.

In FIG. 5, in step S300, the motion compensation unit 110 generates predictive MB data by referring to the image data (reference frame) stored in the frame memory 111. After, in step S301, input MB data to be coded is input to the subtractor 102, the process proceeds to step S302.

In step S302, the subtractor 102 generates predictive error MB data by calculating the difference between the input MB data and the predictive MB data output by the motion compensation unit 110.

In step S303, image coding on the predictive MB data generated in step S302 is performed by the DCT unit 103, the quantization unit 104, and the variable length coding unit 105. In step S304, the multiplexer 106 combines coded data output by the variable length coding unit 105, the pseudo-coded reference data (pseudo-coded reference data for an interface used for obtaining the predictive MB data) stored in the memory 100, and motion-vector data. In step S305, the multiplexer 106 outputs a combined stream.

In step S306, the representative quantized values from the quantization unit 104 are processed by inverse quantization processing of the inverse quantization unit 107 and inverse DCT processing of the inverse DCT unit 108.

In step S307, the adder 109 adds the data processed in step S306 and the predictive MB data, and accumulates the sum as image data of a reference frame for the next frame in the frame memory 111. After that, the p-frame interframe coding of the image coding apparatus 2 ends.

As described above, in the image coding apparatus 2 according to the first embodiment of the present invention, pseudo-coded reference data of an intraframe-coded frame (I frame) is stored in the memory 100, and while an interframe-coded image (P frame) is being processed, a stream in which the pseudo-coded reference data is combined with coded data of the interframe-coded image (P frame) can be output.

Next, an image decoding apparatus 5 adapted for the image coding apparatus 2 shown in FIG. 3 is described below.

Figure 6:
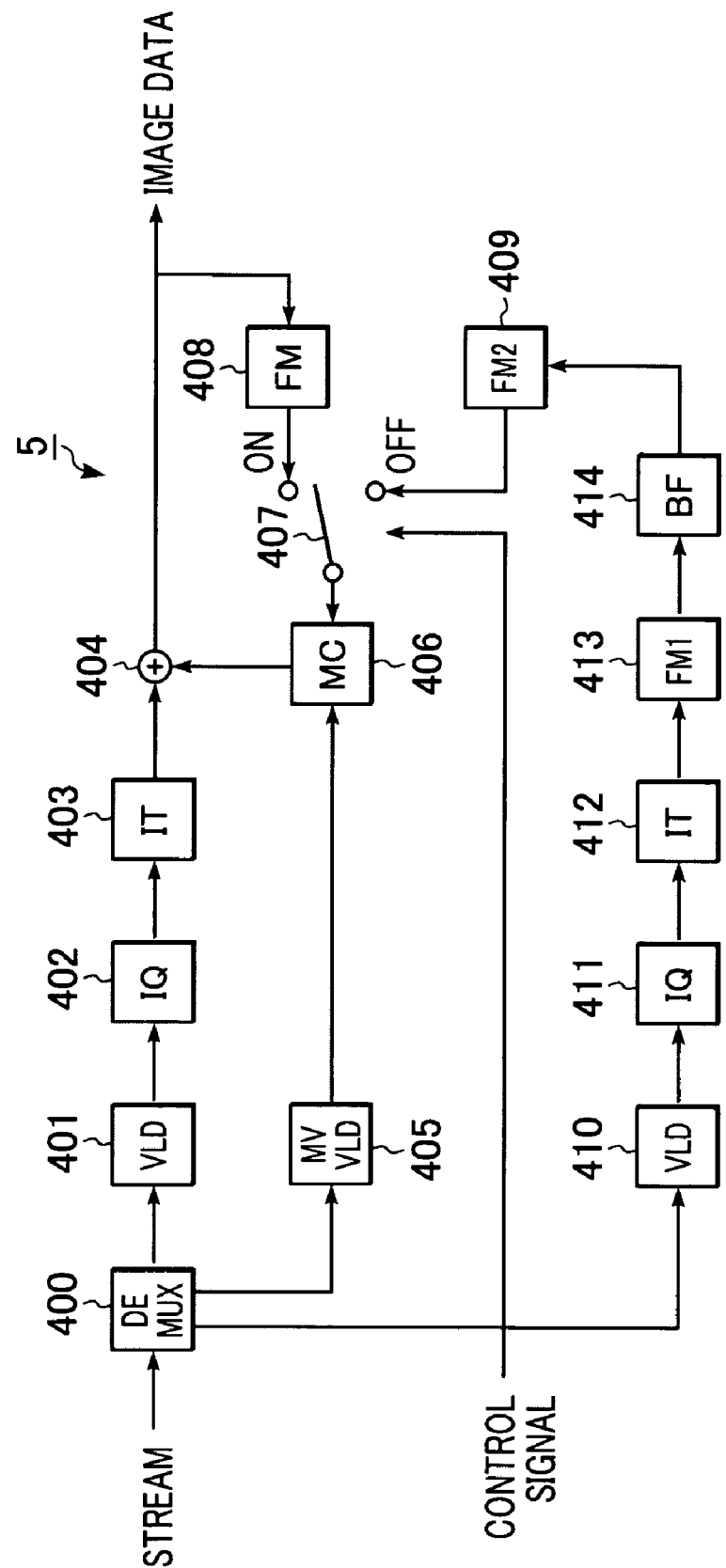
FIG. 6 is a block diagram showing an image decoding apparatus according to a first embodiment of the present invention.

FIG. 6 is a block diagram showing the image decoding apparatus 5 according to the first embodiment of the present invention.

In FIG. 6, the image decoding apparatus 5 outputs image data by decoding a stream input through a network and a receiver (described below).

A separator unit 400 (indicated by "DE MUX" in FIG. 6) separates the input stream input through the receiver into a frame-type code, coded image data, motion-vector data, and pseudo-coded reference data.

A variable length decoding unit 401 (indicated by VLD in FIG. 6) performs variable length decoding on the coded image data separated by the separator unit 400, and outputs the resultant representative quantized values. An inverse quantization unit 402 (indicated by IQ in FIG. 6) performs inverse quantization on the representative quantized values output from the variable length decoding unit 401, and outputs the resultant DCT coefficient data. An inverse DCT unit 403 (indicated by IT in FIG. 6) performs inverse DCT processing on the DCT coefficient data output from the inverse quantization unit 402, and outputs the obtained pixel (image) data.

An adder 404 adds the image data output from the inverse DCT unit 403 and predictive image data output from a motion compensation unit 406 (indicated by MC in FIG. 6) (described later). A motion vector decoding unit 405 (indicated by "MV VLD" in FIG. 6) decodes the motion-vector data separated by the separator unit 400. The motion compensation unit 406 generates predictive MB data from image data stored in a frame memory 408 or 409 (described later) by using the motion-vector data separated by the motion vector decoding unit 405.

In response to an input control signal (whose details are described later), a switch 407 performs switching about which of the frame memories 408 and 409 is connected to the motion compensation unit 406. The control signal is a signal which, when a P frame is decoded, controls the switch 407 in response to a state of whether a reference frame for the P frame is lost or not. The control signal is input from a receiver (described later). In other words, in the image decoding apparatus 5, the switch 407 is controlled in response to the control signal so that, when a normal reference frame is not lost, the motion compensation unit 406 is controlled to refer to image data of the normal reference frame which is stored in the frame memory 408, while, when the normal reference frame is lost, the motion compensation unit 406 is controlled to refer to image data (image data obtained by decoding pseudo-coded reference data) stored in the frame memory 409.

The frame memory 408 stores the image data output from the adder 404. The frame memory 409 stores image data obtained by decoding the pseudo-coded reference data. The stored image data is output by a block noise eliminating filter 414 (indicated by BF in FIG. 6) (described later).

A variable length decoding unit 410 (indicated by VLD in FIG. 6) performs variable length decoding on the pseudo-coded reference data separated by the separator unit 400, and outputs the obtained representative quantized values. A quantization unit 411 (indicated by IQ in FIG. 6) performs inverse quantization on the representative quantized values output from the variable length decoding unit 410, and outputs the obtained DCT coefficients.

A DCT unit 412 performs inverse DCT processing on the DCT coefficients output from the quantization unit 411. A frame memory 413 stores the image data output from the DCT unit 412. The block noise eliminating filter 414 performs filtering on image data read from the frame memory 413.

In the above-described configuration, when the image decoding apparatus 5 according to the first embodiment decodes coded data of a P frame, if a normal reference frame is lost, the image decoding apparatus 5 can perform decoding on the coded data of the P frame by referring to the image data (image data obtained by decoding the pseudo-coded reference data) stored in the frame memory 409.

Next, a process of the image decoding apparatus 5 shown in FIG. 6 is fully described below.

At first, a process in which the image decoding apparatus 5 decodes an I frame that does not use a reference frame is described.

Figure 7:
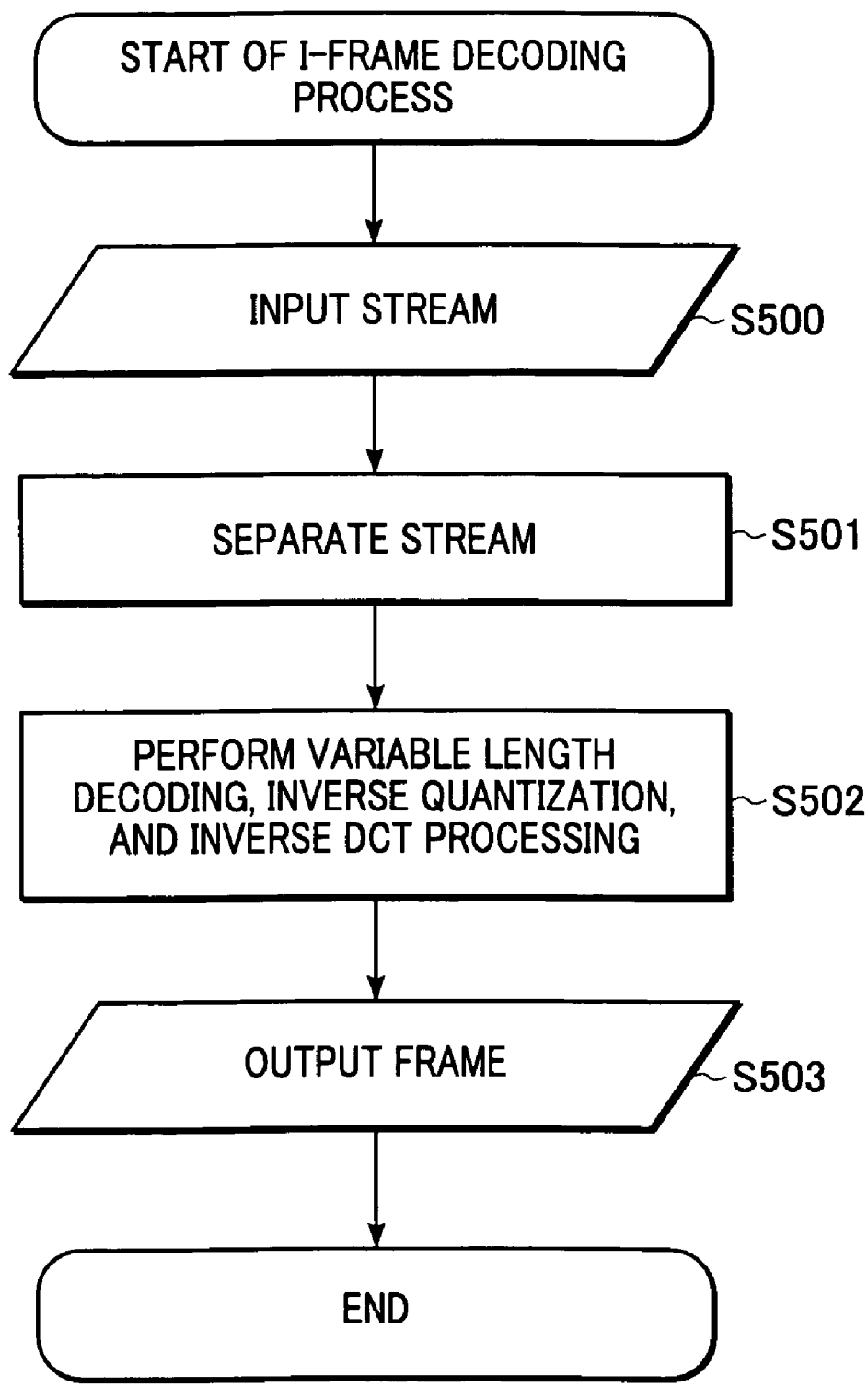
FIG. 7 is a flowchart showing a process in which the image decoding apparatus 5 shown in FIG. 6 performs decoding on an I frame that does not use a reference frame.

FIG. 7 shows the process in which the image decoding apparatus 5 decodes an I frame that does not use a reference frame.

In FIG. 7, in step S500, the I-frame stream output from the image coding apparatus 2 is input to the image decoding apparatus 5 through the receiver.

In step S501, the separator unit 400 separates the input I-frame stream into a frame-type code and coded image data.

In step S502, the variable length decoding unit 401, the inverse quantization unit 402, and the inverse DCT unit 403 respectively perform on the coded image data output from the separator unit 400, variable length decoding, inverse quantization, and inverse DCT processing, whereby the coded image data output from the separator unit 400 is decoded into image data (pixel data). At this time, the image data which is output as an image of reference frame for the next frame from the inverse DCT unit 403 through the adder 404 is stored. After that, in step S503, the image decoding apparatus 5 outputs the decoded I-frame pixel data.

Next, a process in which the image decoding apparatus 5 decodes a P frame by using pixel data of a normal reference frame (when no reception error occurs) is described below.

Figure 8:
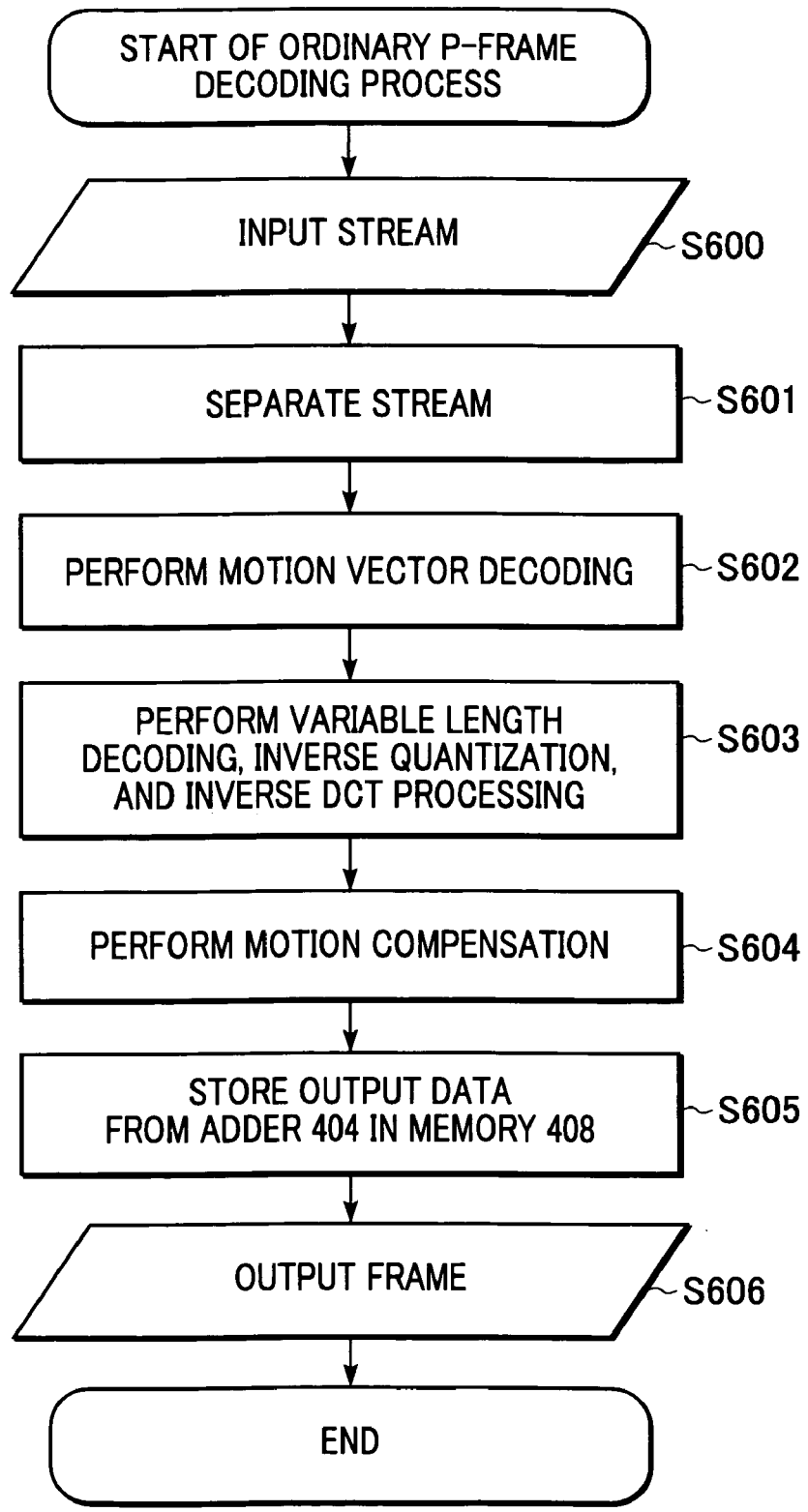
FIG. 8 is a flowchart showing a process in which the image decoding apparatus 5 shown in FIG. 6 performs decoding on a P frame.

FIG. 8 is a flowchart showing the process of the image decoding apparatus 5 for decoding the P frame.

In FIG. 8, in step S600, the P-frame stream output from the image coding apparatus 2 is input to the image decoding apparatus 5 through the receiver.

In step S601, the separator unit 400 separates the P-frame stream into a frame-type code, coded image data, motion-vector data, and pseudo-coded reference data.

In step S602, the motion vector decoding unit 405 decodes the motion-vector data separated by the separator unit 400, and outputs the decoded motion-vector data to the motion compensation unit 406.

In step S603, the coded image data separated by the separator unit 400 is processed such that the variable length decoding unit 401, the inverse quantization unit 402, and the inverse DCT unit 403 perform variable length decoding, inverse quantization, and inverse DCT processing, respectively.

Since a control signal from the receiver (described later) causes the switch 407 to select the frame memory 408, in step S604, the motion compensation unit 406 outputs predictive MB data by using the motion vector decoded by the motion vector decoding unit 405 and referring to image data of a normal reference frame stored in the frame memory 408.

In step S605, after reproducing the P frame by adding the image data output form the inverse DCT unit 403 and the predictive MB data output from the motion compensation unit 406, image data of the reproduced P frame is stored as a reference frame for the next frame in the frame memory 408.

In step S606, the image decoding apparatus 5 outputs the reproduced P-frame image data.

Next, a P-frame decoding process of the image decoding apparatus 5 is described. This P-frame decoding process is performed when a P frame is received ahead of an I frame to be referred to in a stream input through the receiver, and when a reference frame is incomplete due to some reception error occurring in the closest past stream.

Figure 9:
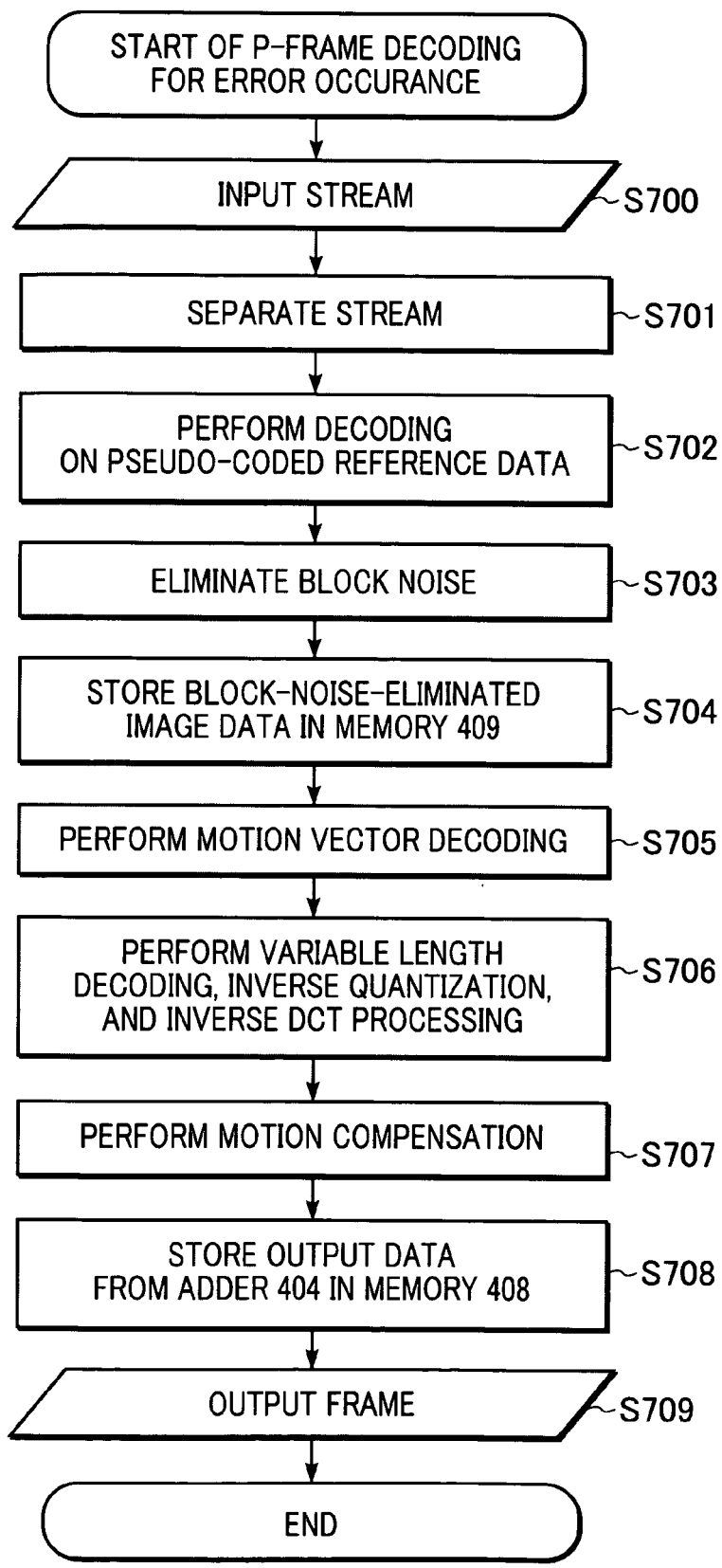
FIG. 9 is a flowchart showing a P-frame decoding process of the image decoding apparatus 5 shown in FIG. 6 in a case in which a normal reference frame is lost or an incomplete case.

FIG. 9 is a P-frame decoding process of the image decoding apparatus 5 when a normal reference frame is lost or incomplete.

In FIG. 9, in step S700, the P-frame stream output from the image coding apparatus 2 is input to the image decoding apparatus 5.

In step S701, the separator unit 400 separates the input P-frame stream into a frame-type code, coded image data, motion-vector data, and pseudo-coded reference data.

In step S702, the image decoding apparatus 5 stores, in the frame memory 413, decoded image data obtained such that the pseudo-coded reference data separated by the separator unit 400 is processed by the variable length decoding unit 410, the quantization unit 411, and the DCT unit 412.

In step S703, the block noise eliminating filter 414 eliminates block noise from image data read from the frame memory 413.

In step S704, the image decoding apparatus 5 stores, in the frame memory 409, image data output from the block noise eliminating filter 414.

In step S705, the motion vector decoding unit 405 decodes the motion-vector data separated by the separator unit 400, and outputs the decoded motion-vector data to the motion compensation unit 406.

In step S706, the coded image data separated by the separator unit 400 is processed such that the variable length decoding unit 401, the inverse quantization unit 402, and the inverse DCT unit 403 perform variable length decoding, inverse quantization, and inverse DCT processing, respectively.

Since the switch 407 selects the frame memory 409, based on a control signal from the receiver, in step S707, the motion compensation unit 406 outputs predictive MB data by using the motion-vector data decoded by the motion vector decoding unit 405 in step S705 and referring to the image data (image data obtained by decoding the pseudo-coded reference data) stored in the frame memory 409.

In step S708, by adding the image output from the inverse DCT unit 403 and the predictive MB data output from the motion compensation unit 406, the P-frame image data is reproduced. The reproduced P-frame image data is stored as a reference frame for the next frame in the frame memory 408.

In step S709, the image decoding apparatus 5 outputs the reproduced P-frame image data.

As described above, when the image decoding apparatus 5 according to the first embodiment of the present invention decodes a stream of interframe-coded images (P frames), if a normal reference frame is lost, the image decoding apparatus 5 can perform decoding on an interframe-coded image (P frame) by referring to an image (stored in the frame memory 409) obtained by decoding pseudo-coded reference data.

Next, the above receiver that outputs a control signal and a received stream to the image decoding apparatus 5 is described below.

Figures 10, 11:
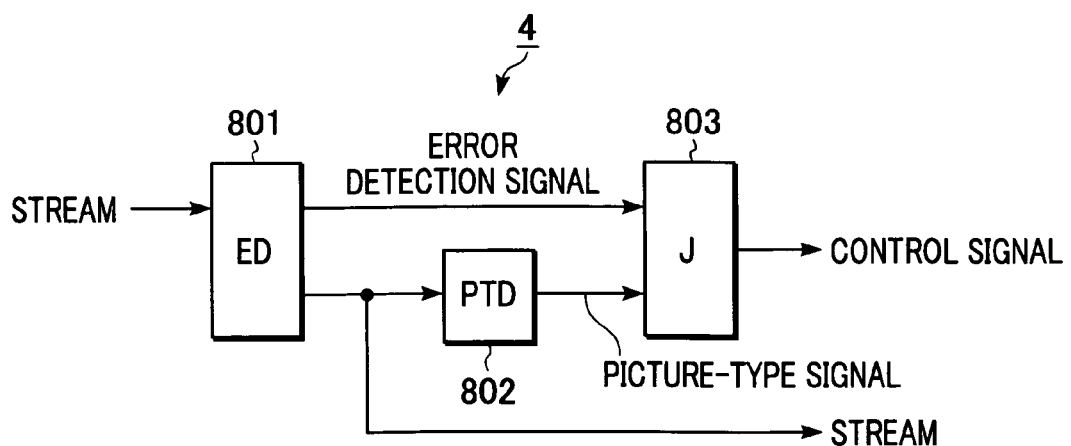
FIG. 10 is a block diagram showing a receiver in a first embodiment of the present invention.
FIG. 11 is an illustration of error detection and the ON and OFF states of a control signal in response to a picture type.

FIG. 10 is a block diagram showing the receiver (denoted by reference numeral 4) in the first embodiment of the present invention.

In FIG. 10, the receiver 4 receives the stream through a network and outputs the received stream to the image decoding apparatus 5. In this process, the receiver 4 performs error detection, etc., on the received stream, and outputs a control signal to the image decoding apparatus 5.

An error detecting unit 801 (denoted by ED in FIG. 10) detects an error in the stream input through the network and outputs an error-detection signal. Also, the error detecting unit 801 controls output by skipping an error-detected stream to the next frame boundary.

A picture-type detecting unit 802 (indicated by PTD in FIG. 10) detects the picture type (code representing an I frame or a P frame in the first embodiment) of the stream externally input through the network, and outputs a picture-type signal (the detected code). The stream input to the receiver 4 is the stream output to the network by the above-described image coding apparatus 2.

Based on the error-detection signal output from the error detecting unit 801 and the picture-type signal output from the picture-type detecting unit 802, when the reference frame for the next frame is detected, an ON signal representing detection of the reference frame is output as the control signal by an identifying unit 803 (indicated by J in FIG. 10), and when the reference frame for the next frame is not detected, an OFF signal representing no detection of the reference frame is output as the control signal by the identifying unit 803.

FIG. 11 shows error detection states and control signal switching based on a picture type. The picture type shown in FIG. 11 is one for the next frame.

Next, the operation of the receiver 4 shown in FIG. 10 is fully described below.

Figure 12:
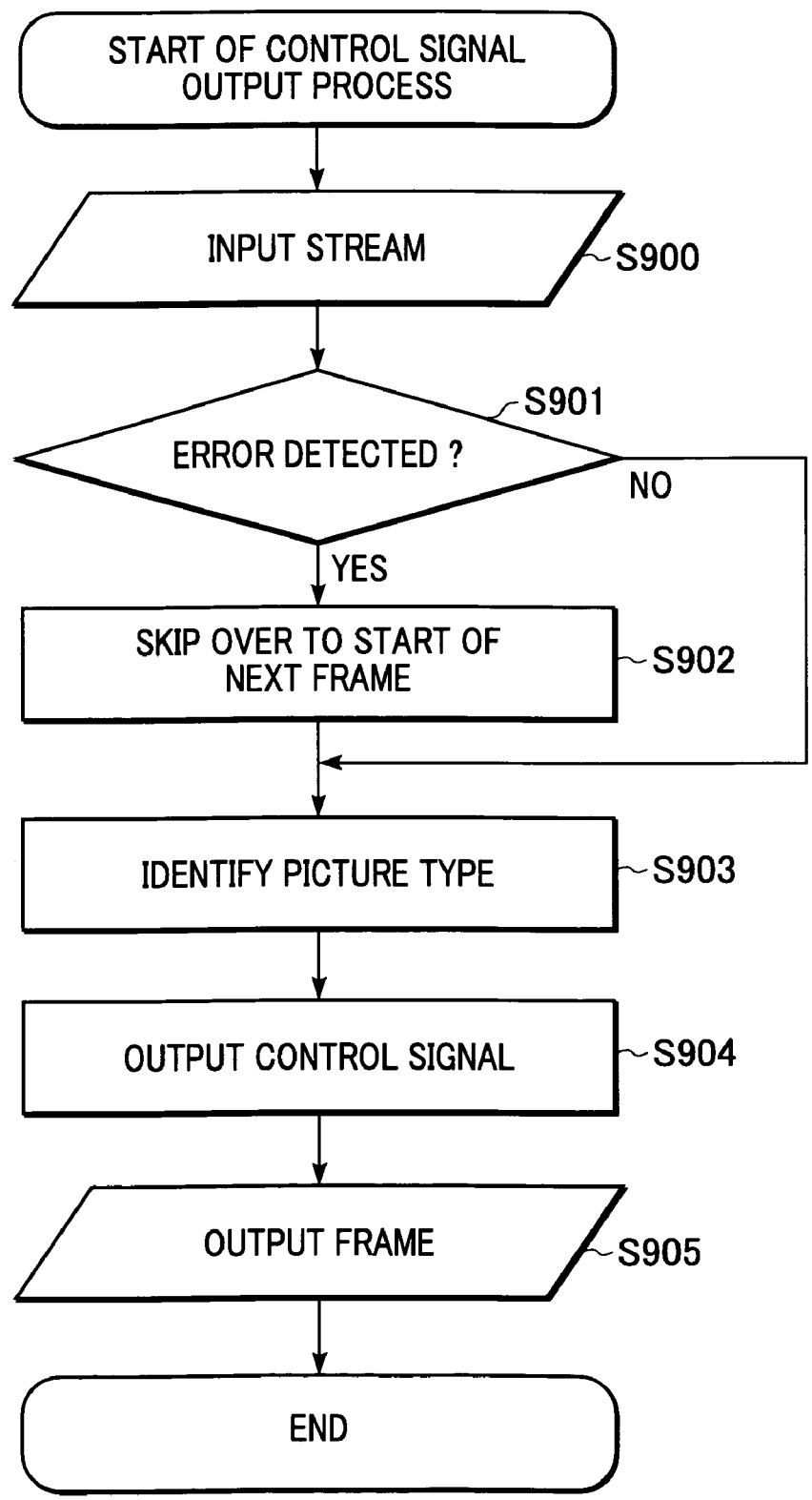
FIG. 12 is a flowchart showing a process in which the receiver 4 shown in FIG. 10 outputs a control signal.

FIG. 12 is a flowchart showing a control signal output process of the receiver 4 shown in FIG. 10.

In FIG. 12, in step S900, the stream is input to the error detecting unit 801 through the network.

In step S901, the error detecting unit 801 determines whether an error is detected in the stream. If the error is detected in the stream (YES in step S901), the error detecting unit 801 outputs an error-detection signal and proceeds to step S902.

In step S902, the process skips to the start of the next frame.

In step S903, the picture-type detecting unit 802 detects the picture type of the next frame and outputs a corresponding code.

In step S904, based on the output of the error detecting unit 801 and the output of the picture-type detecting unit 802, the identifying unit 803 outputs a control signal for controlling the switch 407 to be turned on/off (See FIG. 11).

In step S905, if an error is detected, the receiver 4 outputs a frame-skipped stream, and if no error is detected, the receiver 4 directly outputs the input stream.

Here, an example of a stream in the first embodiment is described below.

Figure 13:
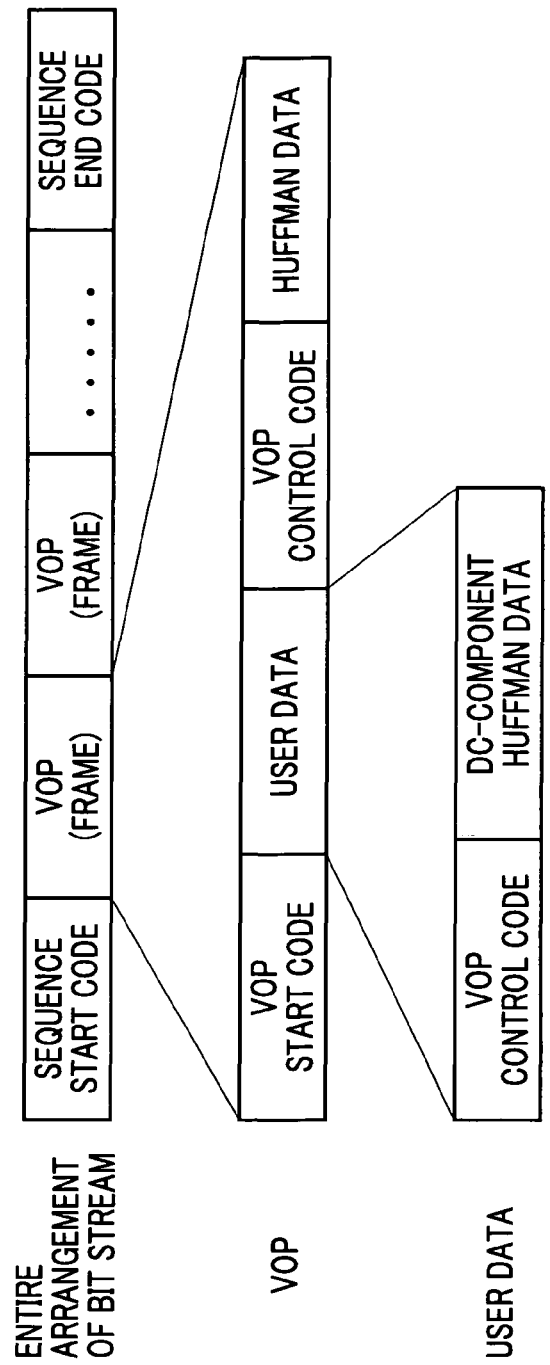
FIG. 13 is an illustration of the structure of a stream in a first embodiment of the present invention.

FIG. 13 is an illustration of an example of a stream in the first embodiment.

As shown in FIG. 13, a stream starts from a sequence start code, is followed by frame-unit data items VOPs (video object planes), and ends with a sequence end code. Also, each VOP includes a VOP start code at the start, user data, a VOP control code, and a Huffman code of image. In the first embodiment of the present invention, the above pseudo-coded reference data in a reference frame for the P frame is included as P-frame user data. In other words, in a P-frame transmission block, the pseudo-coded reference data in the reference frame is located. Accordingly, even if the reference frame for the P frame is lost due to an error or the like, the P frame can be decoded by using, as a reference frame, a frame obtained by decoding the pseudo-coded reference data.

Next, an example of an image transmitting system obtained by combining the image coding apparatus 2 in FIG. 3, the image decoding apparatus 5 in FIG. 6, and the receiver 4 in FIG. 10 is described below.

Figure 14:
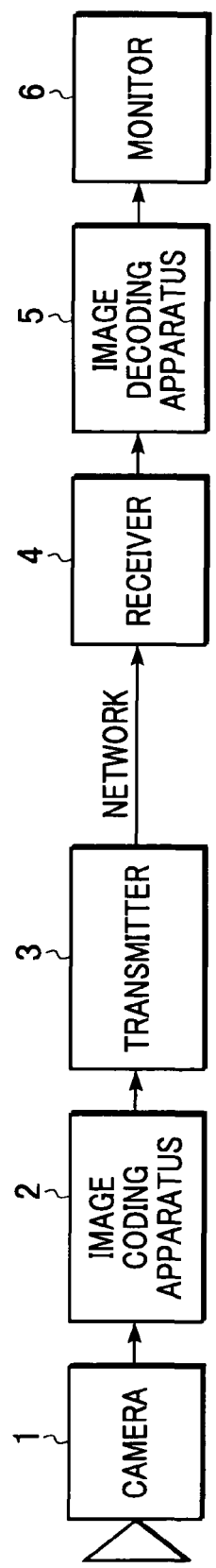
FIG. 14 is a block diagram showing an image transmission system obtained by combining the image coding apparatus 2 shown in FIG. 3, the image decoding apparatus 5 shown in FIG. 5, and the receiver 4 shown in FIG. 10.

FIG. 14 is a block diagram showing the example of the image transmitting system obtained by combining the image coding apparatus 2 in FIG. 3, the image decoding apparatus 5 in FIG. 6, and the receiver 4 in FIG. 10.

In FIG. 14, a camera 1 captures an image and outputs image data. The image coding apparatus 2 outputs a stream based on the image data output from the camera 1. A transmitter 3 transmits the stream output by the image encoding apparatus 2 to a network. The receiver 4 receives the stream transmitted by the transmitter 3 through the network. The image decoding apparatus 5 decodes image data from the stream received by the receiver 4. A monitor 6 displays an image based on the image data decoded by the image decoding apparatus 5.

In the first embodiment of the present invention, the MPEG-4 standard is used as interframe coding on image data. However, the interframe coding is not limited to the MPEG-4 standard, but other interframe coding may be used. Although, in the first embodiment of the present invention, an error detecting function and a picture-type detecting function are provided in the receiver 4, another configuration may be used, such as providing the functions in the image decoding apparatus 5. In the first embodiment of the present invention, block-noise eliminating filtering is performed on a frame in which pseudo-coded reference data is decoded. However, for reducing the processing load, a structure that does not use the block-noise eliminating filtering may be used when the quality of the decoded image is in an allowable range.

As is clear from the above description, in the case of decoding a stream of frames on which interframe-coding is performed, in the image coding apparatus 2 and image decoding apparatus 5 according to the first embodiment of the present invention, even if a reference frame in the frame is lost, decoding can be performed by decoding pseudo-coded reference data in combined form and using the decoded pseudo-coded reference data as a reference frame, whereby a high reproducible image can be obtained.

In addition, in a stream configuration in the first embodiment of the present invention, by locating pseudo-coded reference data of an I frame in the user data, a known decoding apparatus which does not have the decoding function can perform known decoding (image quality deteriorates when error occurs).

Second Embodiment

Next, an image coding apparatus according to a second embodiment of the present invention is described below.

Figure 15:
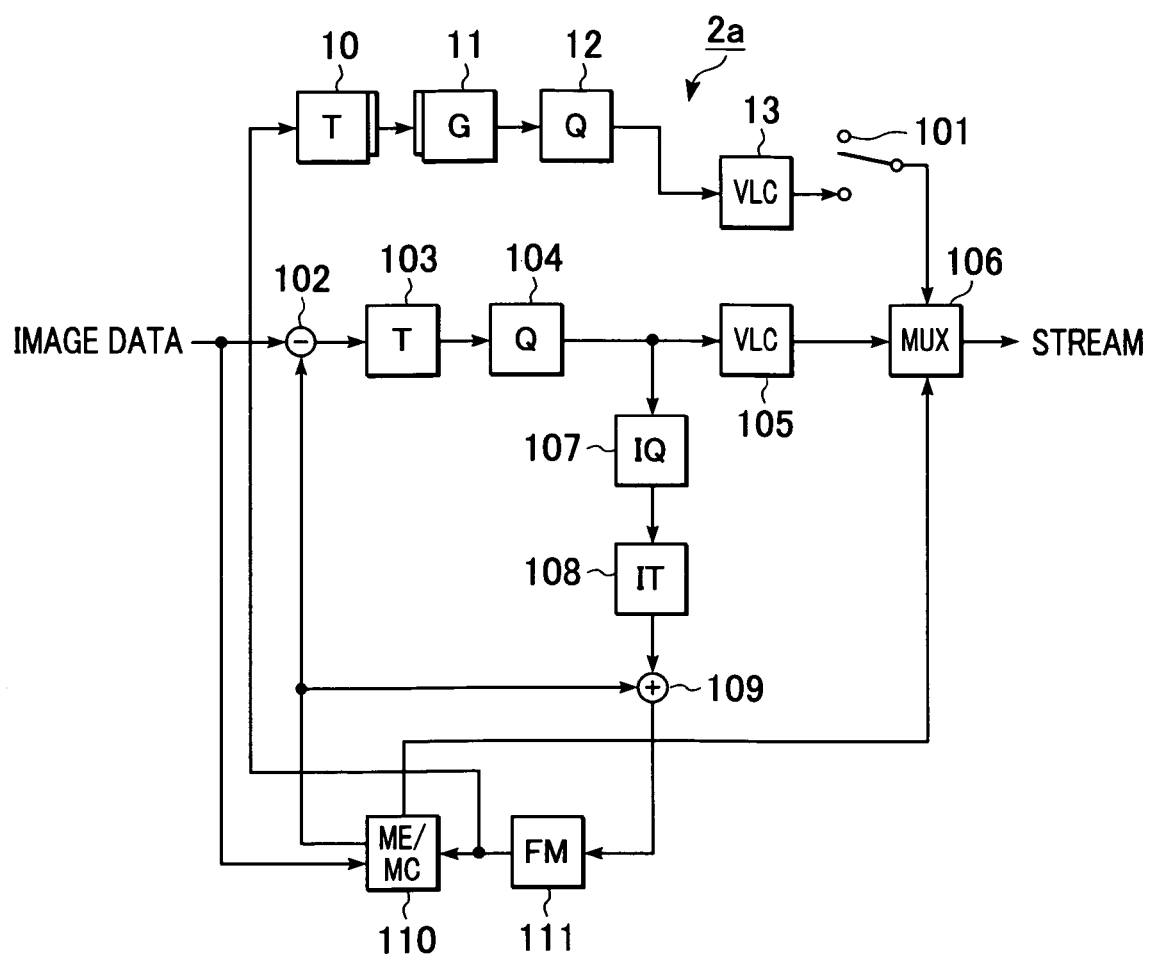
FIG. 15 is a block diagram showing an image coding apparatus according to a second embodiment of the present invention.

FIG. 15 is a block diagram showing the configuration of an image coding apparatus 2a according to the second embodiment of the present invention.

The image coding apparatus 2a shown in FIG. 15 differs from the above image encoding apparatus 2 in that DC components and some of the AC components of a reference frame stored in locally-decoded form in the frame memory 111 are coded as effective components. In other words, although the first embodiment of the present invention generates pseudo-coded reference data from only an I frame, the second embodiment of the present invention can also generate pseudo-coded reference data from a P frame.

Differences of the image coding apparatus 2a are mainly described below.

As shown in FIG. 15, a description of functional units 101 to 111 of the image coding apparatus 2a is omitted since they are identical to those of the image coding apparatus 2 described above.

In FIG. 15, a DCT unit 10 (indicated by T in FIG. 15) performs DCT processing on image data of a reference frame which is stored in the frame memory 111. A generating unit 11 (indicated by G in FIG. 15) outputs coefficient data in which components other than the DC components and some of the AC components (see FIG. 2) in the coefficient data obtained by the DCT unit 10 are regarded as zeroes.

The effective components are not limited to the DC components and some of the AC components, but only the DC components may be regarded as effective and the other components may be regarded as zeroes. Alternatively, some of the AC components may be coefficients other the nine coefficients shown in FIG. 2.

A quantization unit 12 (indicated by Q in FIG. 15) quantizes the coefficient data output from the generating unit 11, and outputs representative quantized values. A variable length coding unit 13 (indicated by VLC in FIG. 15) performs variable length coding on the representative quantized values.

In the above-described configuration, the image coding apparatus 2a according to the second embodiment of the present invention performs quantization and variable length coding by using, as effective data, DC components and some of the AC components of a reference frame on which local decoding is performed, whereby pseudo-coded reference data in the reference frame is generated. Also, when a P frame is processed, by switching on the switch 101, the image coding apparatus 2a uses the multiplexer 106 to output a stream in which the pseudo-coded reference data is combined with P-frame coded data.

Next, the operation of the image coding apparatus 2a in FIG. 15 is fully described below.

At first, an I-frame coding process of the image coding apparatus 2a, that is, a process for coding an I frame which does not use a reference frame, is described below with reference to the flowchart shown in FIG. 16.

Figure 16:
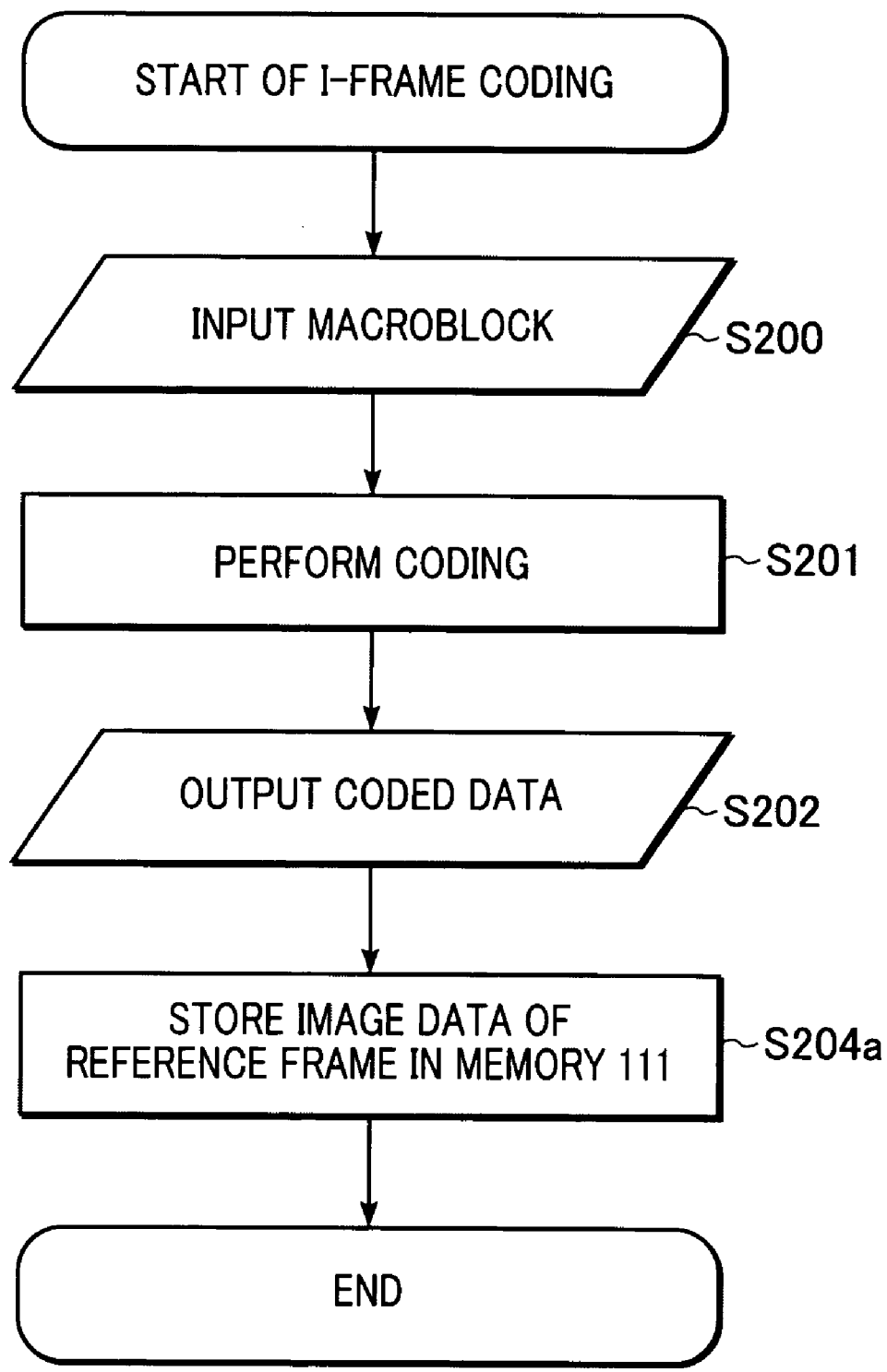
FIG. 16 is a flowchart showing a process in which the image coding apparatus 2a shown in FIG. 15 performs coding on an I frame that does not use a reference frame.

FIG. 16 is a flowchart showing the I-frame (using no reference frame) coding process of the image coding apparatus 2a.

In the process of the image coding apparatus 2a shown in FIG. 16, a description of steps denoted by reference numerals identical to those in the case of the image coding apparatus 2 according to the first embodiment is simplified since the steps are similar to those in FIG. 4.

As shown in FIG. 16, in steps S200 to 202, the image coding apparatus 2a outputs a stream by performing image coding process on input MB data. In step S204a, the frame memory 111 stores, as a reference image (reference frame) for the next frame, image data obtained such that representative quantized values output by the quantization unit 104 are processed by the inverse quantization unit 107 and the inverse DCT unit 108. After that, the I-frame coding process of the image coding apparatus 2a ends.

Next, a process in which the image coding apparatus 2a uses a reference frame to code a P frame is described below with reference to the flowchart shown in FIG. 17.

Figure 17:
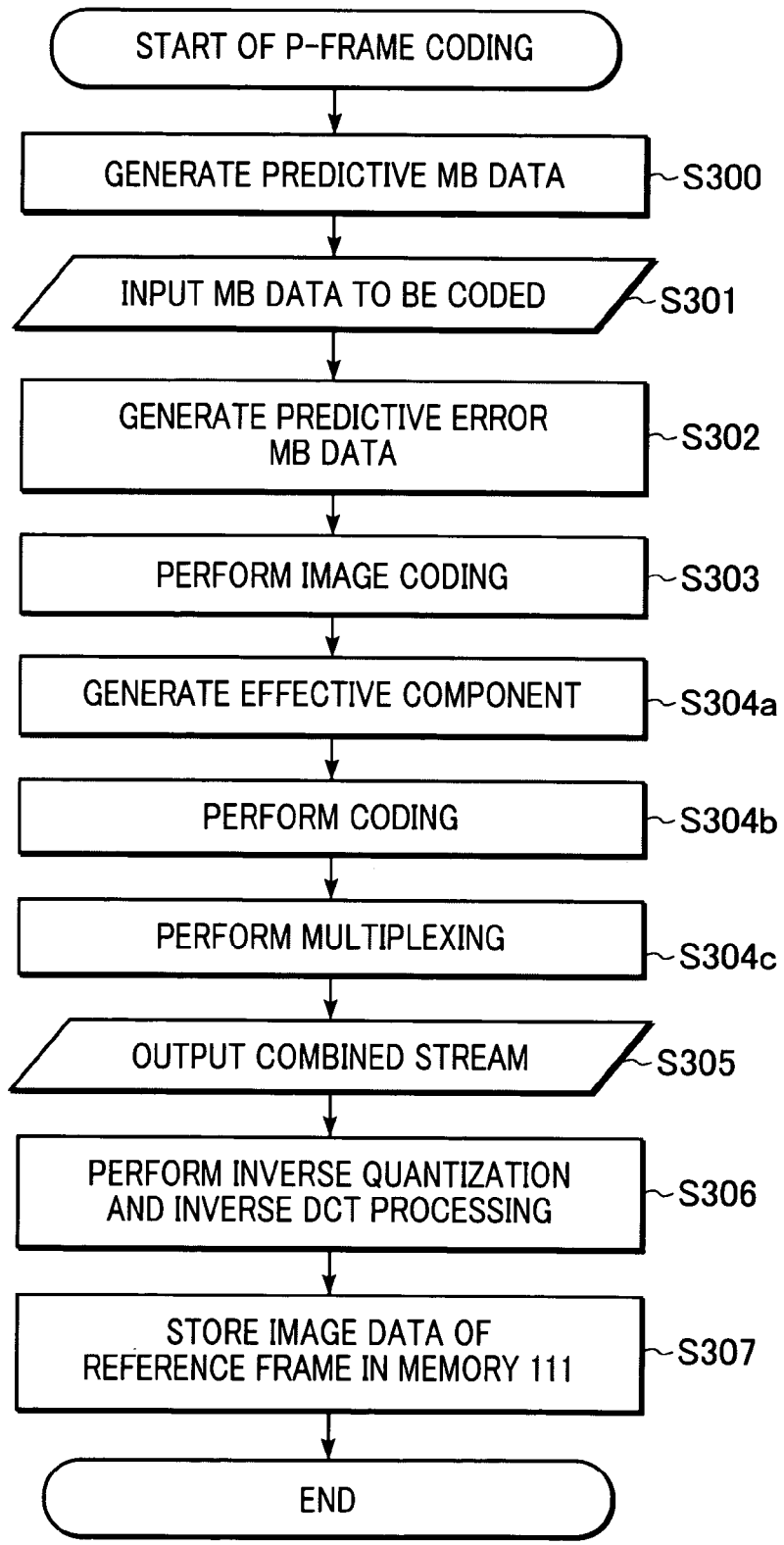
FIG. 17 is a flowchart showing a process in which the image coding apparatus 2a performs decoding on a P frame.

FIG. 17 is a flowchart showing the process in which the image coding apparatus 2a (in FIG. 15) uses a reference frame to code a P frame. In the process shown in FIG. 17 of the image coding apparatus 2a, a description of steps denoted by reference numerals identical to those in the case of the image coding apparatus 2 (in FIG. 5) according to the first embodiment is simplified since the steps are similar to those in FIG. 5.

As shown in FIG. 17, in steps S300 to S303, the image coding apparatus 2a generates predictive MB data for coding the P frame. Based on the generated predictive MB data, the image coding apparatus 2a generates predictive error MB data, and performs coding on the generated predictive error MB data.

In step S304a, the DCT unit 10 transforms the image data (reference frame) stored in the frame memory 111 into DCT coefficient data. Next, the generating unit 11 generates coefficient data in which, in the DCT coefficient data, DC components and some of the AC components are used as effective components (the other components are regarded as zeroes).

In step S304b, pseudo-coded reference data of a reference frame is generated such that the coefficient data generated by the generating unit 12 is coded by the quantization unit 12 and the variable length coding unit 13.

In step S304c, the multiplexer 106 multiplexes the pseudo-coded reference data output from the variable length coding unit 13 and the predictive MB data output from the variable length coding unit 105. The subsequent steps S305 to S307 are identical to those in FIG. 5.

As described above, when an interframe-coded image (P frame) is processed, the image coding apparatus 2a can generate pseudo-coded reference data from the reference frame stored in the frame memory 111, and can output a stream in which the pseudo-coded reference data is combined with the interframe-coded image (P frame).

Decoding of the image data coded by the image coding apparatus 2a in FIG. 15 may be performed similarly to the first embodiment of the present invention by using the image decoding apparatus 5 in FIG. 6.

As is clear from the above description, when a stream output by the image coding apparatus 2a according to the second embodiment of the present invention is decoded by the image decoding apparatus 5, even if a reference frame for a P frame is lost, pseudo-coded reference data in combined form is decoded and used as a reference image, thus enabling decoding on the P frame, whereby a high reproducible image can be obtained. In addition, since the stream configuration in the second embodiment is similar to that shown in FIG. 13, by locating pseudo-coded reference data as user data, a decoding apparatus of the related art can perform known decoding (image quality deteriorates when error occurs).

Other Embodiments

Embodiments of the present invention in the case of using a computer to realize the above image coding apparatuses and image decoding apparatuses are described below.

Figure 18:
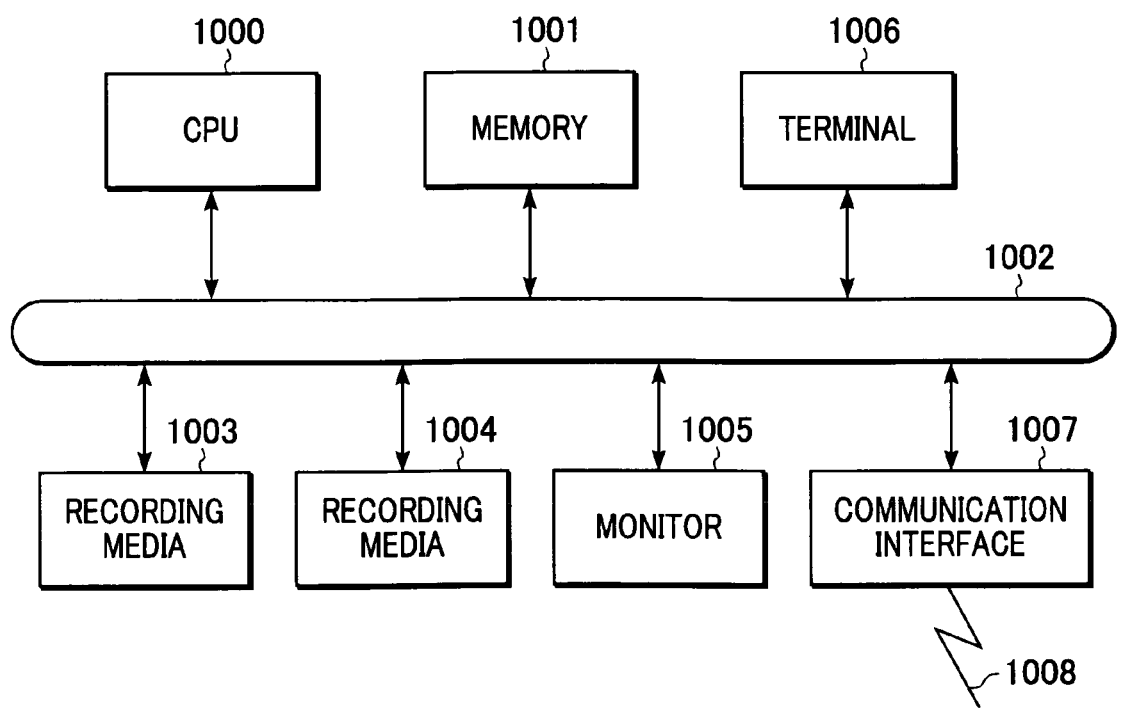
FIG. 18 is a block diagram showing the hardware structure of a computer.

FIG. 18 is a block diagram showing the configuration of hardware of a computer.

In FIG. 18, a central processing unit (CPU) 1000 controls the entirety of the computer and performs various processes. A memory 1001 provides the operating system (OS) required for controlling the computer, software, data, and the storage area required for arithmetic operations. The memory 1001 is also used as a work area when the CPU 1000 performs various processes. The above software includes program code for allowing the CPU 1000 to execute the processes in accordance with the flowcharts shown in FIGS. 4, 5, 16, and 17.

A bus 1002 connects various devices in the computer and exchanges data and control signals. Recording media 1003 is a type of recording medium for storing various types of software. Recording media 1004 is a type of storage media for storing image data. A monitor 1005 displays images, system messages from the computer, etc. A communication interface 1007 transmits coded data (stream) to a communication line 1008. The communication line 1008 is connected to a local area network outside the computer, a public circuit, a wireless link, broadcasting radio waves, etc. A terminal 1006 activates the computer and sets up various conditions such as a bit rate. The memory 1001 further includes an area for reading image data, a code area for temporarily storing coded data, and a working area for storing parameters, etc., for various arithmetic operations.

In this configuration, before performing processing, by using the terminal 1006, from video data stored in the recording media 1004, video data to be coded is selected and activation of the computer is commanded. Then, software stored in the recording media 1003 is loaded into the memory 1001 and is started. The CPU 1000 executes program code in accordance with the flowcharts shown in FIGS. 4, 5, 16, and 17, whereby a video data coding operation is realized. In other words, by using the CPU 1000 and the memory 1001 to constitute the code of each processing block in the image coding apparatus 2 or 2a shown in FIG. 3 or 15, and loading, into the memory 1001, a program for implementing the function of the processing block, the function is realized.

As described above, the computer shown in FIG. 18 realizes the image coding apparatus 2 according to the first embodiment of the present invention and the image coding apparatus 2a according to the second embodiment of the present invention.

Also, it is obvious to realize the image decoding apparatus 5 by storing program code in accordance with the flowcharts shown in FIGS. 7 to 9. In other words, by using the CPU 1000 and the memory 1001 to constitute the code of each processing block in the image decoding apparatus 5 shown in FIG. 6, and loading, into the memory 1001, a program for implementing the function of the processing block, the function is realized.

The computer shown in FIG. 18 may include dedicated hardware having a function similar to part of the processing blocks shown in FIGS. 3, 6, and 15. The memory 1001 is formed by a hard disk drive or magneto-optical disk drive, a nonvolatile memory such as a frame memory, a read-only memory such as a compact-disk read-only memory (CD-ROM), a volatile memory such as a random access memory (RAM), or a computer-readable, computer-writable recording medium which is a combination of the above types of memories.

The "computer-readable recording medium" means a portable medium such as a flexible disk, a magneto-optical disk, a ROM, or a CD-ROM, or a storage device such as a hard disk which is loaded into a computer system. Also, the "computer-readable recording medium" includes a type of memory that holds program code for a predetermined time, such as a volatile memory (RAM) in a computer system that is used as a server or a client when the program code is transmitted through a network, such as the Internet, or a communication line such as a telephone line.

In addition, the program code may be transmitted from a computer system in which the program code is stored in a storage device or the like, to another computer system through a transmission medium or by transmission waves in the transmission medium. The "transmission medium" that transmits the program means a medium having an information transmitting function such as a network (communication network), such as the Internet, and a communication link (communication line) such as a telephone link.

In addition, the above program code may be for realizing part of the above functions. Moreover, the above program may be what is realized in combination with program code already recorded in a computer system, for example, a so-called "difference file".

Moreover, also a program product, such as a computer-readable recording medium with the above program code recorded therein, can be applied as an embodiment of the present invention. The above program code, the recording medium, the transmission medium, and the program product are included in the present invention.

In other words, the foregoing description of embodiments has been given for illustrative purposes only and not to be construed as imposing any limitation in every respect.

The scope of the invention is, therefore, to be determined solely by the following claims and not limited by the text of the specifications and alterations made within a scope equivalent to the scope of the claims fall within the true spirit and scope of the invention.

What is claimed is:

1. An image processing apparatus comprising:
   an input unit configured to input image data;
   a first coding unit configured to encode, in an intracoding mode, the input image data by transforming the input image data into frequency components in units of blocks and coding said frequency components;
   a second coding unit configured to encode, in an intercoding mode, the input image data using reference image data which is obtained by performing local decoding on the image data encoded by said first coding unit;
   a storing unit configured to store the reference image data;
   a central processing unit including a pseudo-coded reference image data generating unit configured to generate pseudo-coded reference image data by limiting the frequency components obtained by the transforming of the input image data in the first coding unit, wherein said pseudo-coded reference image data is used to correct a frame of image data encoded by the second coding unit in a case where the frame of image data encoded by the second coding unit cannot be decoded in a decoding process;
   a switching unit configured to output the pseudo-coded reference data generated by said pseudo-coded reference image data generating unit when coding is performed in the intercoding mode; and
   a multiplexing unit configured to output a stream of multiplexed data obtained by storing the pseudo-coded reference image data outputted by the switching unit into a user data area in a video plane object in a stream of the image data encoded by the second coding unit in a case where the coding is performed in the intercoding mode, and to output a stream of data in which the pseudo-coded image reference data is not stored in a case where the coding is performed in the intracoding mode.

2. An image processing apparatus according to claim 1, wherein said pseudo-coded reference data generating unit performs coding on only direct-current components obtained by limiting said frequency components.

3. An image processing apparatus according to claim 1, wherein said first coding unit and said pseudo-coded reference data generating unit use an MPEG-4 standard to code the image data.

4. An image processing apparatus according to claim 1, wherein the pseudo-coded reference data is used as a reference image when the image data coded in the intercoding mode by said first coding unit is decoded.

5. An image processing method for performing by an image processing apparatus including a multiplexing unit and a storing unit, the image processing method comprising:

an input step of inputting image data;

a first coding step of encoding, in an intracoding mode, the input image data by transforming the input image data into frequency components in units of blocks and coding said frequency components;

a second coding step of encoding, in an intercoding mode, the input image data using reference image data which is obtained by performing local decoding on the image data encoded in said first coding step;

a storing step of storing the reference image data in the storing unit;

a pseudo-coded reference data generating step of generating pseudo-coded image reference data by limiting frequency components obtained by the transforming of the input image data in the first coding step, wherein said pseudo-coded reference image data is used to correct a frame of image data encoded by the second coding step in a case where the frame of image data encoded by the second coding step cannot be decoded in a decoding process;

a switching step of outputting the pseudo-coded reference image data generated by the pseudo-coded reference image data generating step when coding is performed in the intercoding mode; and a multiplexing step, performed by the multiplexing unit, of outputting a stream of multiplexed data obtained by storing the pseudo-coded reference image data outputted in the switching step into a user data area in a video plane object in a stream of the image data encoded in the second coding step in a case where the coding is performed in the intercoding mode, and to output a stream of data in which the pseudo-coded reference image data is not stored in a case where the coding is performed in the intracoding mode.

6. A non-transitory computer-readable recording medium containing computer program code comprising:

input code for inputting image data;

first coding code for encoding, in an intracoding mode, the input image data by transforming the input image data into frequency components in units of blocks and coding said frequency components;

second coding code for encoding, in an intercoding mode, the input image data using reference image data which is obtained by performing local decoding on the image data encoded in said first coding step;

storing code for storing the reference image data in a storing unit;

pseudo-coded reference image data generating code for generating pseudo-coded reference image data by limiting the frequency components obtained by the transforming of the input image data in the first coding code, wherein said pseudo-coded reference image data is used to correct a frame of image data encoded by the second coding code in a case where the frame of image data encoded by the second coding code cannot be decoded in a decoding process;

switching code for outputting the pseudo-coded reference image data generated by said pseudo-coded reference image data generating code when coding is performed in the intercoding mode; and multiplexing code for outputting a stream of multiplexed data obtained by storing the pseudo-coded reference image data outputted in the switching step into a user data area in a video plane object in a stream of the image data encoded in the second coding code in a case where the coding is performed in the intercoding mode, and to output a stream of data in which the pseudo-coded reference image data is not stored in a case where the coding is performed in the intracoding mode.

* * * * *